Figure 1:
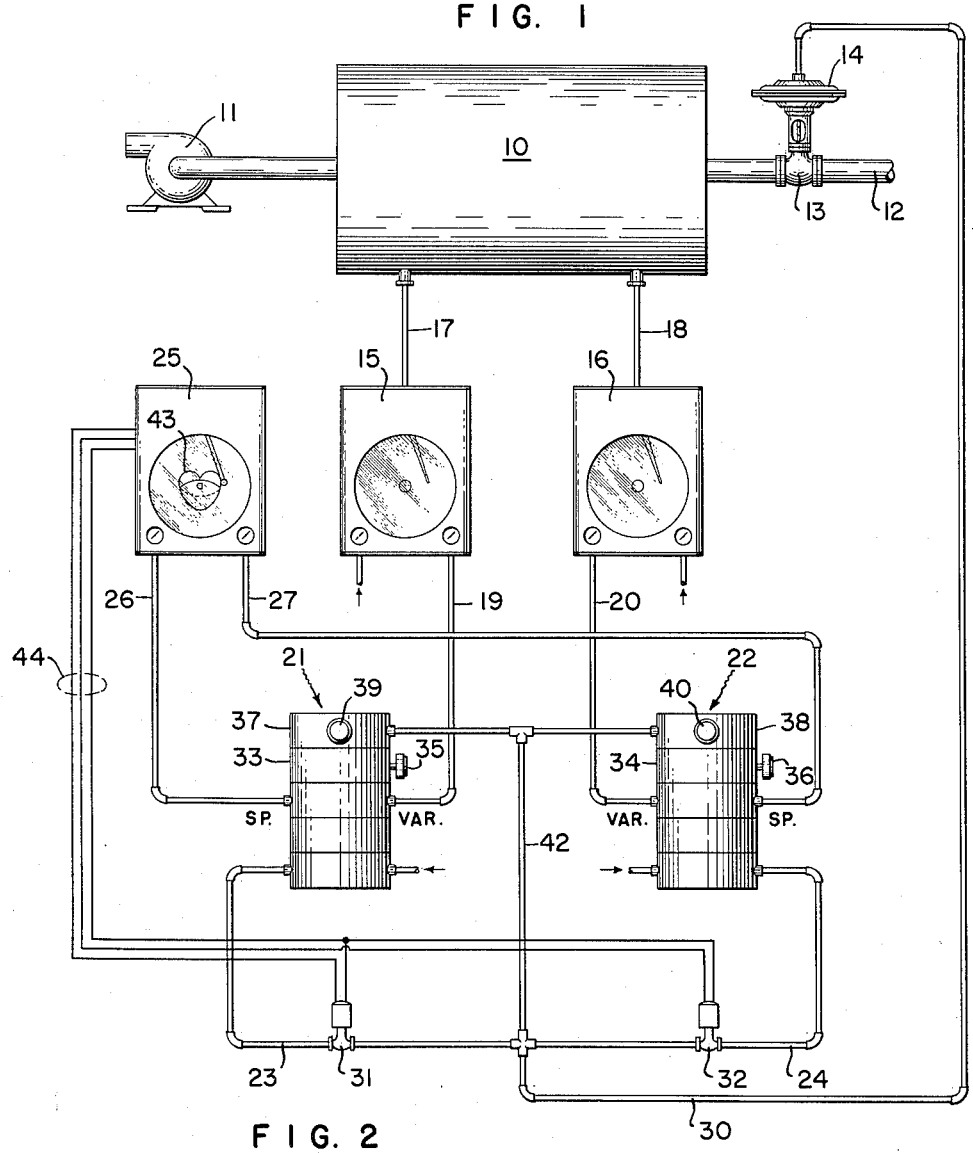

Nov. 15, 1955  R. G. HANEY ET AL  2,723,682
CONTROL APPARATUS
Filed June 1, 1954

INVENTORS.
RICHARD G. HANEY
GEORGE W. McKNIGHT
BY
ATTORNEY.

United States Patent Office 2,723,682
Patented Nov. 15, 1955

2,723,682

CONTROL APPARATUS

Richard G. Haney, Philadelphia, and George W. McKnight, Hatboro, Pa., assignors to Minneapolis-Honeywell Regulator Company, Minneapolis, Minn., a corporation of Delaware Application June 1, 1954, Serial No. 433,691

9 Claims. (Cl. 137—634)

A general object of the present invention is to provide a dual range controller for use in regulating the magnitude of a regulated variable over a wide range. More specifically, the present invention is concerned with utilizing two separate controllers for controlling the magnitude of a variable over a wide range where the control action is transferred from one controller to the other without interruption and without interference with the final control action of the controller.

It has been found that certain types of processes require that one or more of the variables therein must be controlled over a wide range. It has heretofore been customary to use in such a process a wide range controller with the output controller being used to regulate the magnitude of the variable under control. The use of a single controller in a wide range application is frequently accompanied by a loss of accuracy over all or a portion of the range which makes such a controller undesirable. For example, an altitude chamber having pressure control means therefor with the altitude being variable from zero to 100,000 feet requires that there be a pressure variation of 760 mm. of mercury, to represent sea level or zero altitude, to 8 mm. of mercury, which represents 100,000 feet. At the high altitude range, a change of 2 millimeters of mercury results in approximately a 4,000 foot altitude change. At sea level, a 4,000 foot change is indicated by a pressure change of 104 mm. of mercury. Consequently, an instrument having full control effect from zero to 760 millimeters of mercury would require an accuracy in the higher altitude range which is not readily attainable in commercially available instruments.

To circumvent the difficulty arising from the regulating of a variable over a wide range, it has been proposed in the present invention to use a pair of controllers which would be effective to operate over selected portions of the total range of the controlled variable. Such control apparatus must be so arranged that the control action may be effective over the full range and have no accompanying interruption or instability resulting from a transfer from one controller to another.

It is accordingly a more specific object of the present invention to provide an improved controller for a variable employing two separate control devices which are operative as controllers over preselected portions of a wide range of change of a controlled variable wherein such apparatus includes means for maintaining the controllers in step so that when a transfer is made from one controller to the other it will be done without interruption or perceptible change in the output controlling action of the controller.

In apparatus of the present type it is frequently desirable to program the controlled variable through a predetermined schedule. Such a programming may readily be accomplished by a conventional type of program controller which is effective to vary the set points of the main controller in accordance with a preselected schedule. With such a program controller, it is essential that some means be provided for transferring the control action from one controller to the other. Such transfer must be arranged to take place when the controlling ranges of the separate controllers are overlapping so that the transfer may be accomplished without any adverse effects from the final control action.

It is accordingly a further more specific object of the present invention to provide an improved controller using a program scheduling device to regulate the controlling action of a pair of controllers and wherein the control action is transferred from one controller to the other when the control ranges of the two controllers are overlapping.

Another more specific object of the present invention is to provide a dual range controller for a single variable where the controller action is attained by a pair of controllers which are effective over separate portions of a wide range of change of the controlled variable and means including a program controller are used to transfer the controlling action from one controller to the other.

Still another more specific object of the present invention is to provide an improved dual range controller incorporating a pair of separate controllers having internal followup means and reset means with the reset means of both of the controllers being responsive to the final action irrespective of which controller is controlling the regulated variable.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described preferred embodiments of the invention.

Figure 2:
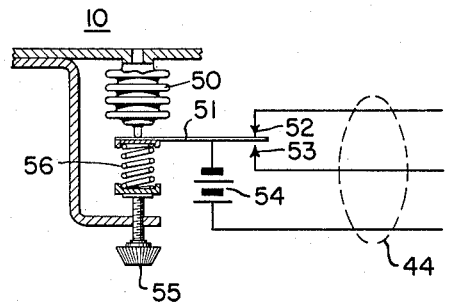

Of the drawings:

Fig. 1 represents a schematic showing of a representative controller incorporating the principles of the present invention; and Fig. 2 shows a modification which may be utilized in the apparatus shown in Fig. 1.

Referring first to Fig. 1, the numeral 10 represents a control chamber such as an altitude chamber for use in processing or testing apparatus. The chamber 10 may be arranged to be evacuated by a suitable pump mechanism 11. The pressure within the chamber 10 may in turn be regulated by an inlet to the chamber including a conduit 12 having a regulating valve 13 in series therewith. A pneumatic valve actuator 14 may be incorporated as part of the valve 13 to regulate the bleed through the conduit 12 into the chamber 10.

For sensing the pressure conditions within the chamber 10, there are provided a pair of pressure transmitting devices 15 and 16. Both of the devices 15 and 16 may well take the form of the pressure transmitter shown in detail in the patent of C. B. Moore, No. 2,311,853, issued February 23, 1943. The transmitter 15 is connected by conduit 17 to the chamber 10 and the transmitter 16 is connected to the chamber 10 by a conduit 18. Both of the transmitters 15 and 16 are effective to produce pressures in the output conduits 19 and 20 which will follow propotionally the input pressures applied to the respective transmitters over the selected range of operation of the respective transmitters.

Also included in the present apparatus are a pair of controllers 21 and 22. These controllers are of the type which are effective to produce output controlling action in the respective output conduits 23 and 24 which vary in accordance with the input signals applied thereto. The input signals in this instance are derived from the transmitters 15 and 16 and from a suitable time pattern transmitter 25 which has a pair of output conduits 26 and 27 which provide a program set point signal for the controllers 21 and 22 respectively. The controllers 21 and 22 may well take the form of the stacked controller shown in the copending application of E. C. Grogan, Serial No. 203,146, filed December 28, 1950. The time pattern transmitter 25 may well take the form of the apparatus disclosed in the patent to E. C. Burdick, No. 2,376,572, issued May 22, 1945.

The output conduits 23 and 24 of the controllers 21 and 22 are arranged for selective control of the final control valve 13 by way of conduit 30. The selective action is attainable by a pair of cutoff relays 31 and 32 which may be electromagnetically actuated.

The controllers 21 and 22 include proportional band sections 33 and 34 with proportional band adjusting knobs 35 and 36. The controllers also include reset sections 37 and 38, said sections being adjustable by suitable restriction adjustors 39 and 40. The proportional band sections are effective to provide a suitable proportioning action of the output control pressure in the output lines 23 and 24 with the gain of the controller being variable by the adjustment of the respective knobs 35 and 36. The reset sections 37 and 38 are provided to eliminate any tendency for offset to occur in the controlling action of the controller and insures that the controlled variable will follow the set point pressure. It will be noted that reset sections 37 and 38 are connected to a common conduit 42 which has therein the output pressure which is fed to the pneumatic actuator 14 of the valve 13. The purpose for this will be explained below.

In considering the operation of the apparatus, it should first be noted that the transmitter 15 has a span of zero to 800 mm. of mercury while the transmitter 16 has a span of zero to 100 mm. of mercury. It will be assumed that the time pattern transmitter is selected to vary the schedule of pressure of the chamber 10 from zero to 100,000 feet and back. The control cams 43 of the transmitter will be effective to establish the desired set point pressures on the controllers 21 and 22 respectively. If the control program is to start at sea level, or 760 mm. of mercury, the transmitter 15, the controller 21 and the set point pressure from conduit 26 of the time pattern transmitter 25 will be effective to establish a desired control pressure in the output of the controller 21 in accordance with the planned schedule. At the start of the operating cycle, the relay or switching valve 31 will be energized so that the output pressure of the controller 21 will pass through conduit 23 and conduit 30 to the pneumatic actuator 14 of the valve 13. At the start, the switching valve 32 will be closed. The controlling of the valves 31 and 32 is accomplished by switches internal to the time pattern transmitter 25 with the controlling action being effected by the electrical leads 44 which connect the valves to the timing pattern transmitter. The output control pressure from the controller 21 will be effective to establish within the chamber 10 a pressure condition which follows the pressure which is being scheduled by the time pattern transmitter 25. As the altitude is increased, the pressure within the chamber 10 will decrease. When the altitude schedule has reached approximately 50,000 feet, the pressure within the chamber 10 will be approximately 87 mm. of mercury. When in this range, it will be apparent that the 87 mm. is within the range of the pressure transmitter 16 which has a zero to one hundred mm. range. When the 50,000 foot altitude has been reached, the time pattern transmitter 25 will be effective to close the valve 31 and open the valve 32. This will transfer the controlling action from the controller 21 to the controller 22 so that now the pressure within the chamber 10 will be regulated by the pressure from the time pattern transmitter 25 through conduit 27, and the variable signal from the pressure transmitter 16 through conduit 20. The output pressure from the controller 22 will pass through conduit 24, valve 32, and conduit 30 to the pneumatic actuator 14 of the valve 13. The time pattern transmitter 25 will continue to call for an increased altitude or decreased pressure within the chamber 10 until the 100,000 foot level is reached at which time the pressure within the chamber will be approximately 8 mm. of mercury.

On the last half portion of the control cycle scheduled by the time pattern transmitter 25, the controller 22 will be in control from the 100,000 foot level to the 50,000 foot level at which time the controller 21 will be switched back into control and the controller 22 will be removed from control. The controller 21 will then be effective to take the pressure down to sea level to complete an operating cycle.

As pointed out above, the reset chambers 37 and 38, of the controllers 21 and 22 respectively, are connected to respond to the output pressure supplied to the pneumatic actuator 14 of the valve 13. The necessity for this will be readily apparent when it is noted that the controllers 21 and 22 are operative over separate ranges. Thus, the controller 22 is effective only when the pressure within the chamber 10 falls within the range of the transmitter 16. Since the pressure within the transmitter 16 will be calling for a maximum change of pressure in the conduit 20 and since the pressure from the set point time pattern transmitter 25 by way of conduit 27 will be calling for a different pressure, there is a tendency for the reset chamber 38 to accumulate pressure which would attempt to eliminate the pressure deviation indicated by the input signals to the controller. Any accumulated reset in the chamber 38 is difficult to quickly remove in the absence of some special device so that if a transfer is made from the controller 21 to the controller 22 with a large accumulated reset in the chamber 38, there is a tendency for a wide deviation to occur in the output control pressure in conduit 30. This deviation is sometimes referred to as a bump and it may further be accompanied by a continuous offset until the reset in the chamber 38 can catch up with the actual conditions existing in the apparatus. Consequently, it is desirable that the reset of both of the controllers be maintained in step regardless of which of the two controllers is in control.

It will be noted that both of the controllers 21 and 22 have individual proportional band or gain adjustments 35 and 36 respectively. The presence of these adjustments permits much closer control in the selection of the gain of the individual controllers over the range of operation of the overall apparatus. In other words, it is desirable that the controller 22 have a different gain than that of controller 21 in order to achieve optimum gain for the separate ranges of operation of the separate controllers.

The presence of this feature is particularly valuable where the process is non-linear or the control valve is non-linear. Thus, the two controllers may be made to be effective to operate on selected portions of the full range with the optimum control condition for each controller being effective in its respective range. In some forms of the present apparatus it may be desirable to compromise high sensitivity in favor of a different type of controlling action over different portions of the range of operation. This may readily be achieved by the present apparatus.

It will be noted that the instruments 15 and 16 are both continuously connected to the process. This permits increased readability of the entire range of operation. In other words, indicator 15 in operating over the 0–800 mm. range would be accurate to approximately 8 mm. The indicator 16 in operating over the 0–100 mm. range would be accurate to approximately 1 mm. The end result is that instrument 15 will provide an accurate altitude indication in the low altitude range and instrument 16 will provide an accurate indication in the high altitude range.

Manual control of the set points for the controllers 21 and 22 may also be used. The range of operation of the respective controllers is then selected with the same thought to optimum control operation of each controller. The transfer may be accomplished automatically as shown or by suitable manual means.

Referring to Fig. 2, there is shown a modified form of apparatus for switching valves 31 and 32. This modification provides apparatus for switching the valves directly from the pressure condition within the chamber 10. A pressure sensing capsule or bellows 50 has an internal portion thereof exposed to the pressure condition within the chamber 10 and this bellows actuates a switch blade 51 which is effective to control the energization circuit for the valves 31 and 32 in accordance with the movement of the blade 51 between switch contacts 52 and 53. A battery 54 is connected to the blade 51 and to one of the energizing leads 44. A selector 55 is effective to adjust the biasing action of a spring 56 which cooperates with the bellows 50 to determine the set point at which the switching action shall take place.

The apparatus of Fig. 2 would replace the apparatus internal of the time pattern transmitter 25 and would effect the switching of the controls from controller 21 to controller 22 at the 50,000 foot level either on the increase or the decrease, as explained above. It will be readily apparent that other switching apparatus may be employed.

While the apparatus disclosed has been shown in conjunction with an altitude test chamber, it is to be understood that it is applicable to any type of a controller wherein there is some variable to be controlled and that variable is to be controlled over a wide range where the sensitivity of a single controller would not be effective to maintain a requisite high degree of accuracy or control. Such a variable may be temperature, flow, or the like.

While, in accordance with the provisions of the statutes, there has been illustrated and described the best forms of the embodiments of the invention known, it will be apparent to those skilled in the art that changes may be made in the forms of the apparatus without departing from the spirit of the invention as set forth in the appended claims and that in some cases certain features of the invention may be used to advantage without a corresponding use of other features.

Having now described my invention, what I claim as new and desire to secure by Letters Patent is:

1. A dual range controller for a variable comprising, a pair of variable sensing means responsive to a single input variable, each of said sensing means being selectively responsive to separate but overtapping portions of the range of change of said variable and having an output signal variable proportionally with the change in magnitude of the variable in the selected portion of the range, a first controller having follow up and reset means and connected to respond to the output of one of said sensing means, a second controller having follow up and reset means and connected to respond to the output of the other of said sensing means, a single output variable regulator having said first and second controllers connected thereto, a feedback connection from said output regulator to the reset means of both of said first and second controllers, and means for rendering one or the other of said first or second controllers ineffective in accordance with the selected range of said variable.

2. In apparatus for regulating the magnitude of a variable over a wide range, the combination comprising, a pair of controllers having follow up and reset means, each of said controllers having an input which proportionally follows the magnitude of the regulated variable over a selected range of change of said variable different from the other controller, a variable regulator having said pair of controllers connected in controlling relation thereto, an internal follow up in each of said controllers, a feedback connection from said regulator to the reset means of both of said controllers, and control means connected to render either one or the other of said pair of controllers effective to control said regulator.

3. Apparatus for regulating the magnitude of a variable over a wide range, comprising, a pair of signal transmitters both having the magnitude of the controlled variable as an input and each having an output signal varying proportionally with the magnitude of the input variable over different selected portions of the range of change of the variable, a first controller having an input signal from one of said signal transmitters and a further input signal from a first set point source, a second controller having an input signal from the other of said signal transmitters and a further signal from a second set point source, means for programming said first and second set point sources through a predetermined schedule to effect changes in the variable in the different selected portions of the range of change of the variable, means connecting both of said controllers to a variable regulator, and means rendering the connection of one or the other of said controllers ineffective in accordance with the selected range of said variable.

4. Apparatus as defined in claim 3 wherein each of said first and second controllers has a reset means included therein, and both of said reset means are continuously connected to said regulator so that when control is transferred from one controller to the other there will be no change in control action due to accumulated reset in either of said controllers.

5. Apparatus as defined in claim 3 wherein the means for rendering the connection of one or the other of said controllers ineffective comprises said programming means.

6. Apparatus as defined in claim 3 wherein the means for rendering the connection of one or the other of said controllers ineffective comprises means responsive to the magnitude of the controlled variable.

7. Apparatus for regulating the magnitude of a variable over a wide range comprising, a pair of signal transmitters both having the magnitude of the controlled variable as an input and each having an output signal varying proportionally with the magnitude of the input variable over different selected portions of the range of change of the variable, a first controller having an input signal from one of said signal transmitters and a further input signal from a first set point source, a second controller having an input signal from the other of said signal transmitters and a further signal from a second set point source, a separate gain control for each of said first and second controllers, means for programming said first and second set point sources through a predetermined schedule to effect changes in the variable in the different selected portions of the range of change of the variable, means connecting both of said controllers to a variable regulator, and means rendering the connection of one or the other of said controllers ineffective in accordance with the selected range of said variable.

8. Apparatus for regulating the magnitude of a variable over a wide range comprising, a pair of signal transmitters both having the magnitude of the controlled variable as an input and each having an output signal varying proportionally with the magnitude of the input variable over different selected portions of the range of change of the variable, a first controller having an input signal from one of said signal transmitters and a further input signal from a set point source, a second controller having an input signal from the other of said signal transmitters and a still further signal from said set point source, a separate gain control for each of said first and second controllers, means connecting both of said controllers to a variable regulator, and means for selectively rendering one or the other of said controllers ineffective to regulate said variable.

9. Apparatus as defined in claim 8 wherein said means for rendering one or the other of said controllers ineffective comprises means for effecting a switching action when the controlling action of said first and second controllers is overlapping.

No references cited.